US012667918B2

(12) United States Patent
Clark

(10) Patent No.: US 12,667,918 B2
(45) Date of Patent: Jun. 30, 2026

(54) METHOD OF MANUFACTURING A DOME MADE OF WELDED COMPONENTS

(71) Applicant: ROLLS-ROYCE PLC, London (GB)

(72) Inventor: Daniel Clark, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 508 days.

(21) Appl. No.: 18/252,512

(22) PCT Filed: Oct. 28, 2021

(86) PCT No.: PCT/EP2021/079906
§ 371 (c)(1),
(2) Date: May 10, 2023

(87) PCT Pub. No.: WO2022/106170
PCT Pub. Date: May 27, 2022

(65) Prior Publication Data
US 2023/0398642 A1 Dec. 14, 2023

(30) Foreign Application Priority Data
Nov. 19, 2020 (GB) ...................................... 2018181

(51) Int. Cl.
B23K 33/00 (2006.01)
B23K 31/02 (2006.01)
(Continued)

(52) U.S. Cl.
CPC ............ B23K 33/004 (2013.01); B23K 31/02 (2013.01); E04B 1/3211 (2013.01);
(Continued)

(58) Field of Classification Search
CPC .................................................... E04B 1/3211
See application file for complete search history.

(56) References Cited

U.S. PATENT DOCUMENTS

| 4,230,255 A | 10/1980 | Coulter |
| 4,600,139 A | 7/1986 | Murase |
| (Continued) | | |

FOREIGN PATENT DOCUMENTS

| CN | 111794378 A | 10/2020 |
| DE | DD210943 A1 | 6/1984 |
| (Continued) | | |

OTHER PUBLICATIONS

Japanese Office Action, corresponding to JP 2023-530287, dated Jun. 13, 2025.
(Continued)

*Primary Examiner* — Babajide A Demuren
(74) *Attorney, Agent, or Firm* — Quarles & Brady LLP

(57) ABSTRACT

Method of manufacturing a dome comprising: providing a plurality of components; joining a first and a second component together, joining the first and second components together comprising: positioning the first component and the second component in an initial position in which the first surfaces of components are angled from each other by a first angle; melting a volume of material extending between the first and the second component, the volume of material increasing in thickness from the second surfaces to the first surfaces; and the volume of material cooling and solidifying so as to join the first component and the second component together, the cooling of the volume of material reducing the angle between the first surfaces to a second angle less than the first angle such that the first surfaces face towards a centre of the dome and the first and second components form part of the dome.

13 Claims, 20 Drawing Sheets

(51) Int. Cl.
  *E04B 1/32* (2006.01)
  *B23K 101/12* (2006.01)
  *G21C 13/087* (2006.01)

(52) U.S. Cl.
  CPC ... *B23K 2101/12* (2018.08); *E04B 2001/3241* (2013.01); *E04B 2001/3276* (2013.01); *E04B 2001/3294* (2013.01); *G21C 13/087* (2013.01)

(56) References Cited

U.S. PATENT DOCUMENTS

| | | | | |
|---|---|---|---|---|
| 6,134,849 | A * | 10/2000 | Holler | E04B 1/3211 |
| | | | | 52/80.1 |
| 2004/0134136 | A1 | 7/2004 | Shearing | |
| 2020/0299951 | A1 | 9/2020 | Drew | |
| 2025/0112585 | A1* | 4/2025 | Dizajgan | E04B 1/30 |

FOREIGN PATENT DOCUMENTS

| | | | |
|---|---|---|---|
| EP | 2508290 | A1 | 10/2012 |
| GB | 859072 | A | 1/1961 |
| JP | 2002273587 | A | 9/2002 |
| JP | 2013253870 | A | 12/2013 |
| WO | 2011068201 | A1 | 6/2011 |
| WO | WO-2017/161455 | A1 | 9/2017 |
| WO | WO-2020/085492 | A1 | 4/2020 |

OTHER PUBLICATIONS

UKIPO Search Report, Application No. GB-2018181.4, dated May 4, 2021, 2 pages.
International Search Report & Written Opinion, International Application No. PCT/EP2021/079906, mailed on Feb. 2, 2022, 14 pages.

* cited by examiner

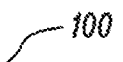
*100*

Providing a plurality of components comprising a plurality of pairs of components, each of the plurality of pairs of components comprising a first component and a second component, the first component having a first body portion defining a first surface and a second surface opposing the first surface and the second component having a second body portion defining a first surface and a second surface opposing the first surface

*A1*

Joining the first and second components of each of the plurality of pairs of components together so as to form at least part of the dome

*A2*

Positioning the first component and the second component in an initial position in which the first surface of the first body portion and the first surface of the second body portion are angled from each other by a first angle

*B1*

Melting a volume of material extending between the first body portion and the second body portion, the volume of material increasing in thickness from the second surfaces of the first and second body portions to the first surfaces of the first and second body portions

*B2*

The volume of material cooling and solidifying so as to join the first component and the second component together, the cooling of the volume of material reducing the angle between the first surface of the first body portion and the first surface of the second body portion to a second angle less than the first angle such that the first surface of the first body portion and the first surface of the second body portion face towards a centre of the dome and the first and second components form part of the dome

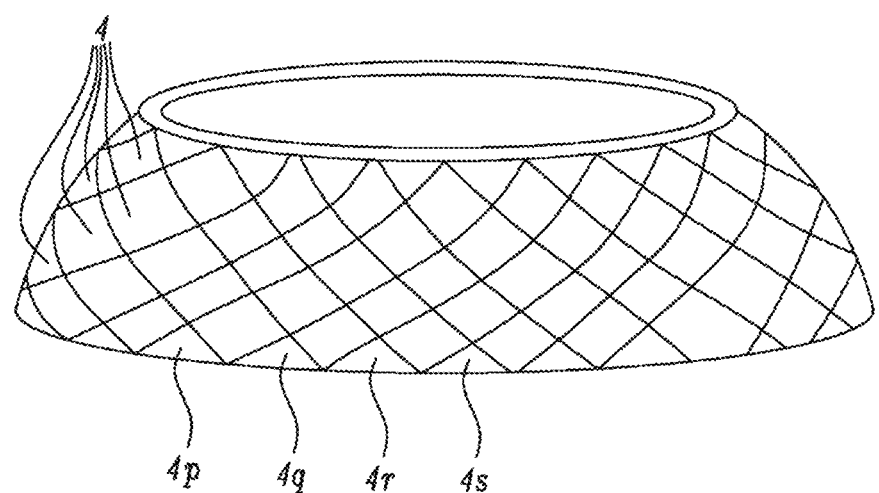
*FIG. 12*

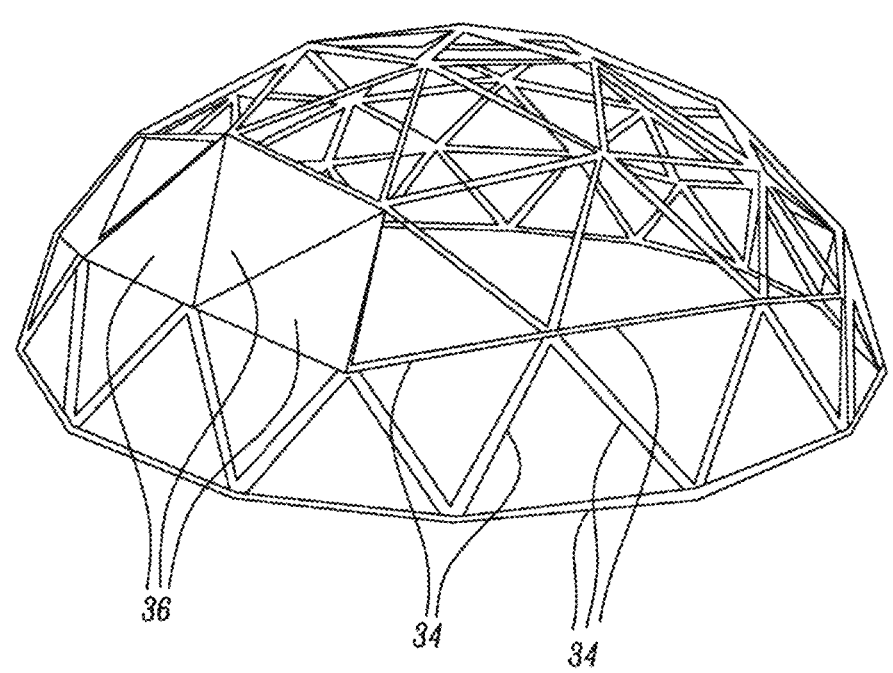
*FIG. 16*

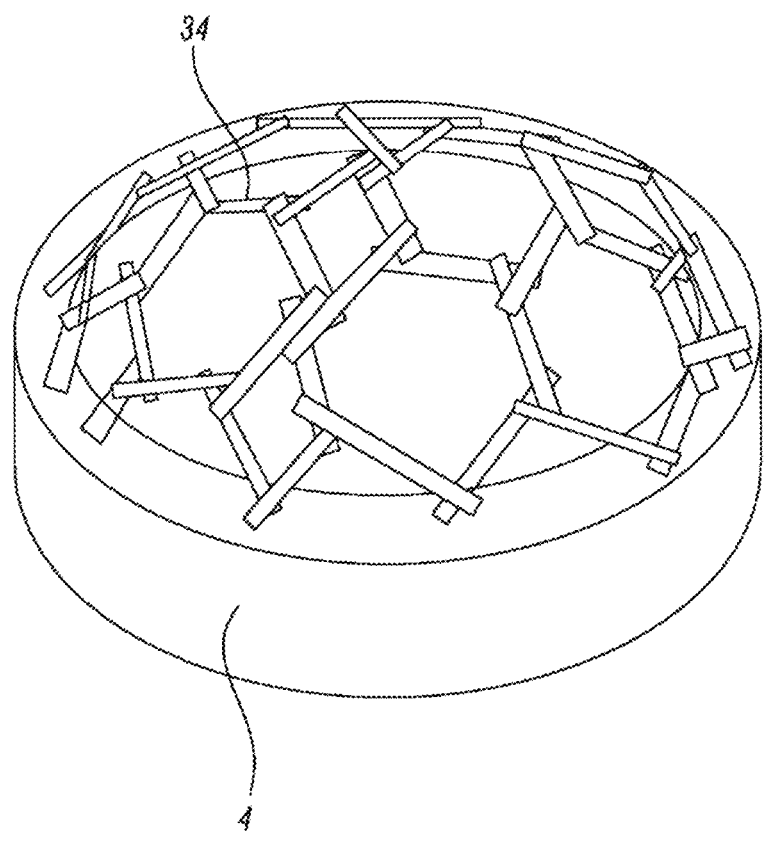
*FIG. 17*

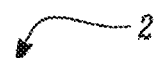
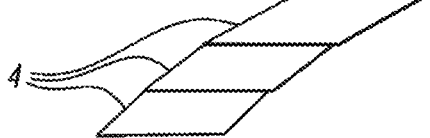
*FIG. 19*

1

METHOD OF MANUFACTURING A DOME MADE OF WELDED COMPONENTS

RELATED APPLICATIONS

This application is a 35 U.S.C. § 371 national phase application of PCT/EP2021/079906 (WO-2022/106170 A1), filed on Oct. 28, 2021, entitled "A METHOD OF MANU-FACTURING A DOME MADE OF WELDED COMPO-NENTS", and claims priority to GB-2018181.4 filed on Nov. 19, 2020, which is incorporated herein by reference in its entirety.

FIELD OF THE DISCLOSURE

The disclosure relates to a method of manufacturing a dome and a dome manufactured using the method.

BACKGROUND

Power stations commonly comprise reactors housed within domed containment vessels. The containment vessel is designed to contain toxic material released by the reactor in the event of the reactor malfunctioning. Domed vessels are typically made from petals which are forged off-site before being craned into position. Such a process is typically time-consuming and expensive, requires a significant amount of space on site and requires good weather condi-tions for assembly.

It is therefore desirable to provide an improved method of manufacturing a dome and a dome manufactured using the method.

SUMMARY OF THE DISCLOSURE

According to a first aspect, there is provided a method of manufacturing a dome, the method comprising: providing a plurality of components comprising a plurality of pairs of components, each of the plurality of pairs of components comprising a first component and a second component, the first component having a first body portion defining a first surface and a second surface opposing the first surface and the second component having a second body portion defin-ing a first surface and a second surface opposing the first surface; and joining the first and second components of each of the plurality of pairs of components together so as to form at least part of the dome. Joining the first and second components of each of the plurality of pairs of components together comprises: positioning the first component and the second component in an initial position in which the first surface of the first body portion and the first surface of the second body portion are angled from each other by a first angle;

melting a volume of material extending between the first body portion and the second body portion, the volume of material increasing in thickness from the second surfaces of the first and second body portions to the first surfaces of the first and second body portions; and the volume of material cooling and solidifying so as to join the first component and the second component together, the cooling of the volume of material reducing the angle between the first surface of the first body portion and the first surface of the second body portion to a second angle less than the first angle such that the first surface of the first body portion and the first surface of the second body portion face towards a centre of the dome and the first and second components form part of the dome.

The volume of material may comprise a filler material distinct from the first and second components.

The volume of material may be formed from the first component and the second component.

The volume of material of pairs of components forming a lower portion of the dome may comprise a filler material and the volume of material of pairs of components forming an upper portion of the dome may be formed from the first component and the second component.

The first body portion and the second body portion are not melted.

Two or more of first body portions and the second body portions may each comprise a slot and a protrusion. Each slot may be configured to receive a protrusion and each protrusion may be configured to be received by a slot.

The width of the slots may be larger than the width of the protrusions.

The first and second components may be blocks or plates.

The plurality of components may be arranged in a helical spiral.

The helical spiral may have a single start.

The helical spiral may have a plurality of starts.

Each of the plurality of components may overlap hori-zontally with one or more of the other of the plurality of components.

The first and second components may be beams.

The plurality of components may form a geodesic dome.

The first and second components of pairs of components in a lower portion of the dome may be blocks or plates. The first and second components of pairs of components in an upper portion of the dome may be beams.

The extent by which the volume of material increases in thickness from the second surfaces of the first and second body portions to the first surfaces of the first and second body portions may increase in relation to the distance of the pair of components from a base of the dome.

A step of calculating a predicted change in the angle between the first surface of the first body portion and the first surface of the second body portion, during cooling and solidifying of the volume of material, and; trimming either the first or second component so that the angle β obtained after cooling will match a required angle may be used.

The step of calculating the change in the angle may comprise modelling the heat input of a welding process, using the heat input to calculate the amount of weld metal laid down and the resulting dynamic temperature distribu-tion.

According to a second aspect, there is provided a dome manufactured in accordance with the method of any pre-ceding statement.

BRIEF DESCRIPTION OF THE DRAWINGS

Arrangements will now be described, by way of example, with reference to the accompanying drawings, in which:

FIG. 3 is a flowchart of a method of manufacturing the dome;

FIG. 5 is a further flowchart of the method of manufac-turing the dome;

FIG. 12 is a perspective view of a third alternative dome part way through manufacture;

FIG. 16 is a perspective view of a fourth alternative dome;

FIG. 17 is a perspective view of a fifth alternative dome;

FIG. 19 is a further cross-sectional view of the blocks.

DETAILED DESCRIPTION

Figure 1:
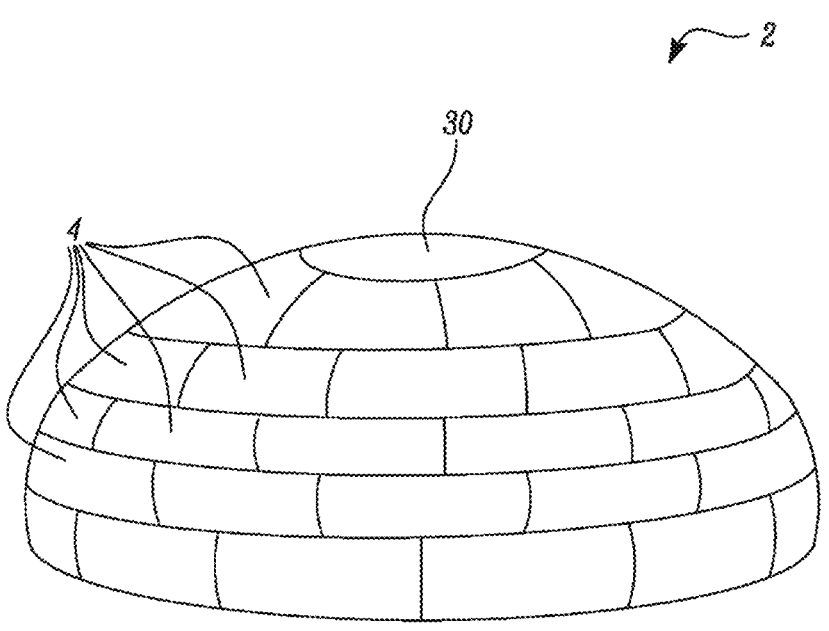
FIG. 1 is a perspective view of a dome.

FIG. 1 shows a dome 2 comprising a plurality of components in the form of blocks 4 or plates. The dome 2 is a containment vessel for reactor such as a small modular reactor (SMR). However, the dome 2 may alternatively be a petrochemical, pharmaceutical, food or power vessel, or be used for any other suitable purpose.

Figure 2:
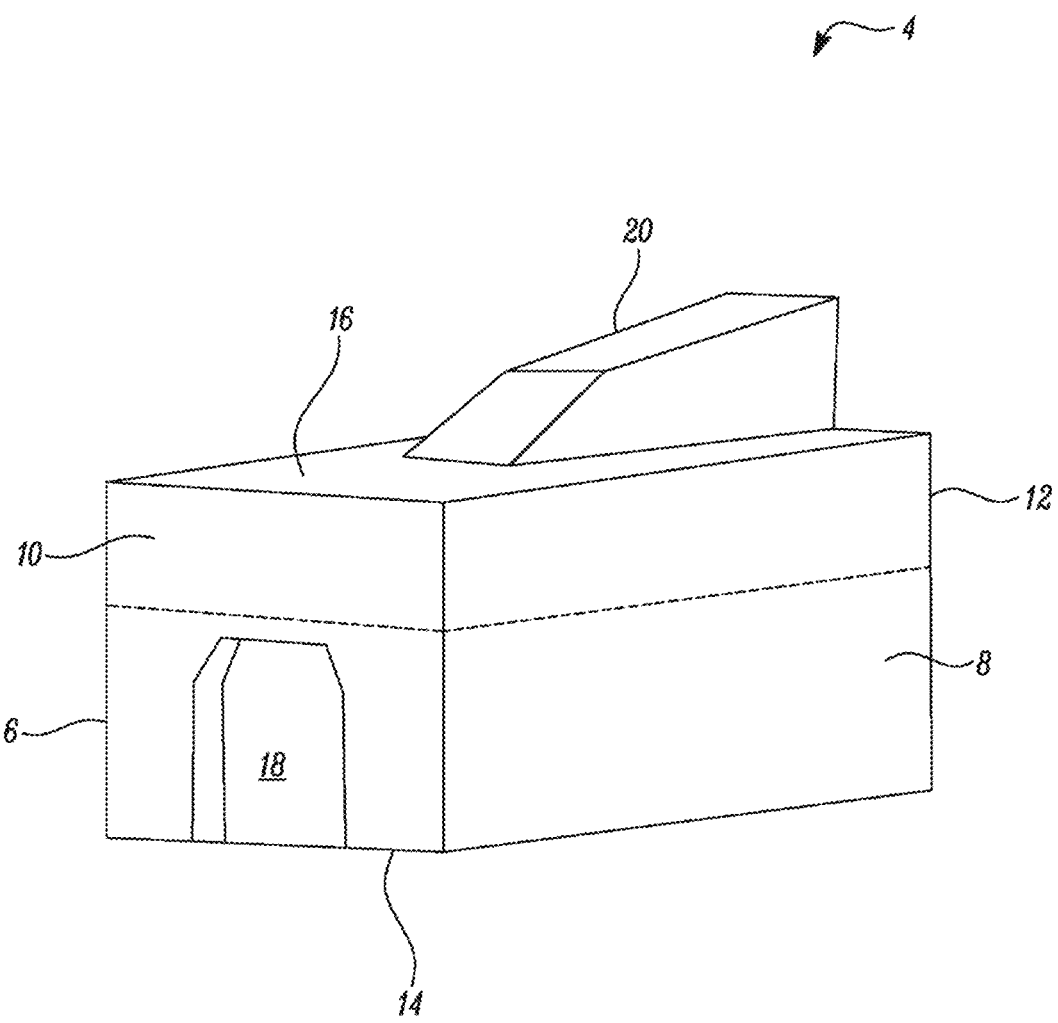
FIG. 2 is a perspective view of a block of the dome.

FIG. 2 shows a single one of the blocks 4 in isolation. The block 4 is cuboid and comprises a first surface 6 (not shown in FIG. 2), a second surface 8 opposing the first surface 6, a third surface 10, a fourth surface 12 opposing the third surface 10, a fifth surface 14 and a sixth surface 16 opposing the fifth surface 14. The first surface 6 forms part of an inner surface of the dome 2. The second surface 8 forms part of an exterior surface of the dome 2. The third and fourth surfaces 10, 12 are side surfaces. The fifth and sixth surfaces 14, 16 are lower and upper surfaces, respectively. The fifth surface 14 comprises a slot 18 (i.e. a mortise) which extends between the third and fourth surfaces 10, 12. The sixth surface 16 comprises a protrusion (i.e. a tenon or stud) in the form of an angled flange 20, which may be moulded or three-dimensionally printed. The width of the slot 18 (i.e. the width of the slot 18 in a direction from the first to the second surfaces 6, 8) is larger than the width of the flange 20 (i.e. the width of the flange 20 in a direction from the first to the second surfaces 6, 8). The block 4 is substantially cuboidal in shape. However, the angle θ formed between the first surface 6 and the third surface 10 is greater than 90 degrees.

FIG. 3 shows a flowchart of a method 100 of manufacturing the dome 2 comprising a first step A1 and a second step A2. The first step A1 comprises providing a plurality of components such as a plurality of blocks 4 of the type shown in FIG. 2. The plurality of blocks 4 comprises a plurality of pairs of blocks 4 comprising a first block 4a and a second block 4b.

Figure 4:
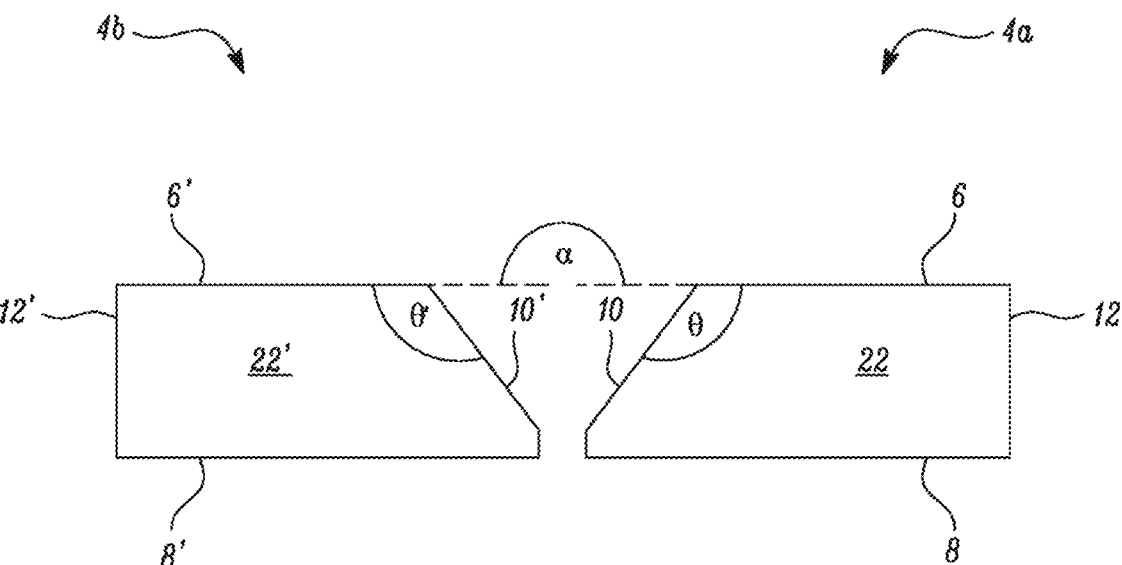
FIG. 4 is a first cross-sectional view of a first block and a second block of a pair of blocks.

FIG. 4 shows a first block 4a and a second block 4b of a pair of blocks. The first and second blocks 4a, 4b are shown in cross-section along a plane corresponding to the dashed line shown in FIG. 2. The first block 4a corresponds to the block 4 shown in FIG. 2. The second block 4b substantially corresponds to the first block 4a, and features of the second block 4b corresponding to features of the first block 4a are denoted using the same reference numerals, with the addition of an apostrophe. The first block 4a and the second block 4b are mirrored such that their third surfaces 10, 10' face each other. The first block 4a comprises a first body portion 22 and the second block 4b comprises a second body portion 22'. The first body portion 22 defines the first and second surfaces 6, 8 of the first block 4a. The second body portion 22' defines the first and second surfaces 6', 8' of the second block 4b.

Returning to FIG. 3, the second step A2 comprises joining the first and second blocks 4a, 4b of each of the plurality of pairs of blocks 4a, 4b together so as to form at least part of the dome 2.

FIG. 5 shows a flow chart of the substeps of step A2, comprising a first substep E1, a second substep B2 and a third substep B3. The first substep 1 comprises positioning the first block 4a and the second block 4b in a first relative position in which the first surface 6 of the first body portion 22 and the first surface 6' of the second body portion 22' face a common direction and are angled from each other by a first angle α. Such an arrangement is shown in FIG. 4, in which the first surface 6 of the first body portion 22 and the first surface 6' of the second body portion 22' are angled from each other by a first angle α of 180 degrees. The blocks 4 (e.g. the first and second blocks 4a, 4b) may be positioned in place using cranes and/or winches.

The second substep B2 comprises melting a volume of material 24 extending between the first body portion 22 and the second body portion 22'. The volume of material 24 may be a filler material or consumable used for welding. The first body portion 22 and the second body portion 22' are not melted.

Figure 6:
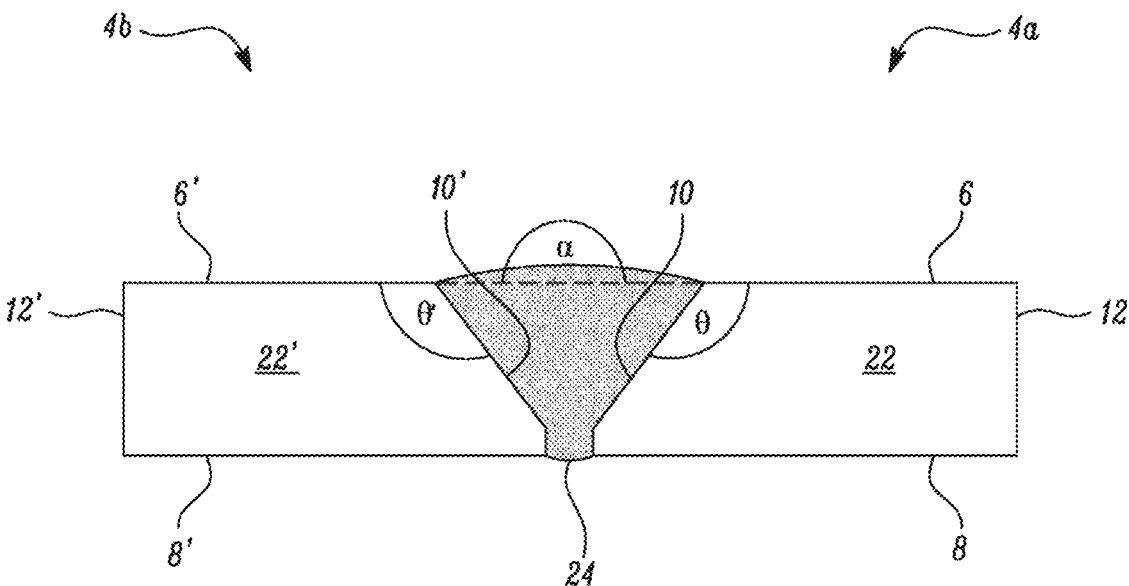
FIG. 6 is a second cross-sectional view of the first block, the second block and a melted volume of material.

The volume of material 24 increases in thickness from the second surfaces 8, 8' of the first and second body portions 22, 22' to the first surfaces 6, 6' of the first and second body portions 22, 22'. Accordingly, the volume of material 24 is wedge-shaped. The resulting arrangement is shown in FIG. 6. The volume of material 24 remains melted and the first surface 6 of the first body portion 22 and the first surface 6' of the second body portion 22' remain angled from each other by a first angle α of 180 degrees.

The third substep B3 comprises the volume of material 24 cooling and solidifying so as to join the first block 4a and the second block 4b together. The volume of material 24 reduces in size during cooling due to thermal expansion. Since the volume of material 24 increases in thickness from the second surfaces 8, 8' to the first surfaces 6, 6', the extent to which the volume of material 24 reduces in size during the cooling process increases from the second surfaces 8, 8' to the first surfaces 6, 6'. This uneven reduction in size caused by the cooling of the volume of material 24 reduces the angle between the first surface 6 of the first body portion 22 and the first surface 6' of the second body portion 22' to a second angle β less than the first angle α such that the first surface 6 of the first body portion 22 and the first surface 6' of the second body portion 22' form part of an inner surface of the dome 4 and face towards or substantially towards a centre of the dome (i.e. a central point or axis of the dome).

Figure 7:
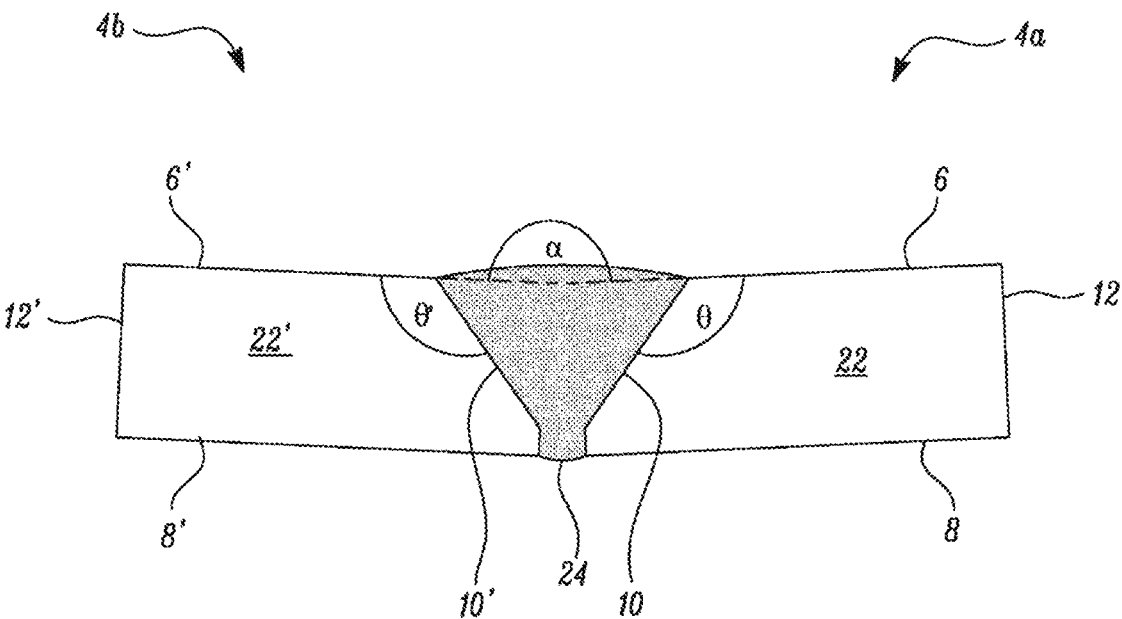
FIG. 7 is a third cross-sectional view of the first block, the second block and a solidified volume of material.

The resulting arrangement is shown in FIG. 7, in which the first block 4a and the second block 4b have been welded together. The weld may be achieved using multi-pass welding techniques. Although not shown, the first and second blocks 4a, 4b may be machined with features such as holes so as to allow bolting and pinning of the blocks 4 in different axes. The blocks 4 and welds may be heat treated. The joints may subsequently be consumed by a second welding process such as rotary taper friction welding.

Figure 8:
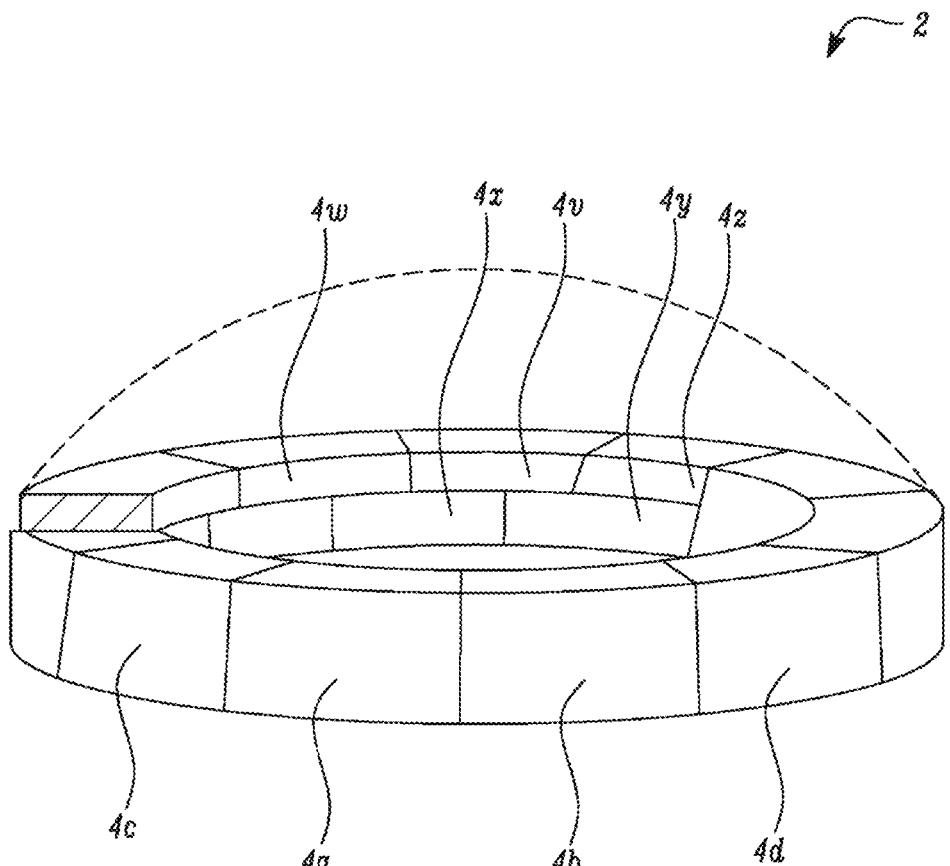
FIG. 8 is a perspective view of the dome part way through manufacture.

FIG. 8 shows the dome 2 part way through manufacture. During the manufacturing process, the plurality of pairs of blocks 4 are joined together sequentially such that lower parts of the dome 2 can support the manufacture of upper parts of the dome 2. The slots 18 of the blocks 4 receive flanges 20 of adjacent blocks 4 so as to provide additional support during the manufacturing process. Since the slots 18 are wider than the flanges 20, the blocks 4 are able to move relative to each other as the volume of material 24 cools during substep B3.

It will be appreciated that a single block 4 can form part of multiple pairs of blocks 4. By way of example, block 4a and block 4b shown in FIG. 8 form a pair of blocks. However, block 4a and block 4c also form a pair of blocks and block 4b and block 4d form a pair of blocks. By way of another example, block 4x and block 4w form a pair of blocks, block 4x and block 4v form a pair of blocks, block 4x and block 4y form a pair of blocks, block 4y and 4v form a pair, and block 4y and block 4z form a pair of blocks. Each block may form part of multiple pairs of blocks, up to a pair with each of its adjacent blocks. Joints of the type described above may therefore be made between a block and multiple other blocks via a plurality of its surfaces 10, 12, 14, 16. In the arrangement shown in FIG. 8, the blocks 4 are arranged in a helical spiral. The helical spiral is a single helical spiral with a single start formed by block 4y.

The diameter of the dome 2 is greatest at the base of the dome 2 and reduces with height. Accordingly, the angle between the first and second body portions 22, 22' increases in relation to the distance of the first and second body portions 22, 22' from the base of the dome 2. This may be achieved by varying the geometry of the blocks 4 based on their distance from the base of the dome 2. For example, during the first substep 1, the first angles α of the pairs of blocks 4a, 4b may be greatest at the base of the dome 2 and reduce in a direction away from the base of the dome 2. The angles θ formed between the first and third surfaces 6, 10 may be smallest at the base of the dome 2 and increase in a direction away from the base of the dome 2. The extent to which the volume of material 24 increases in thickness from the second surface 8, 8' to the first surface 6, 6' may be smallest at the base of the dome 2 and increase in a direction away from the base of the dome 2.

At lower regions of the dome 2 the blocks 4 are arranged substantially vertically, whereas at higher regions of the dome 2 the blocks 4 are arranged substantially horizontally. In the arrangement shown in FIG. 1, the blocks 4 are arranged in a single layer. A keystone 30 (i.e. a cap or dish), which may be formed of the same material as the blocks 4 and be welded thereto, is used to close the dome 2. The keystone 30 is shown as being located centrally on the dome 2, but may alternatively be located off-centre.

Figure 9:
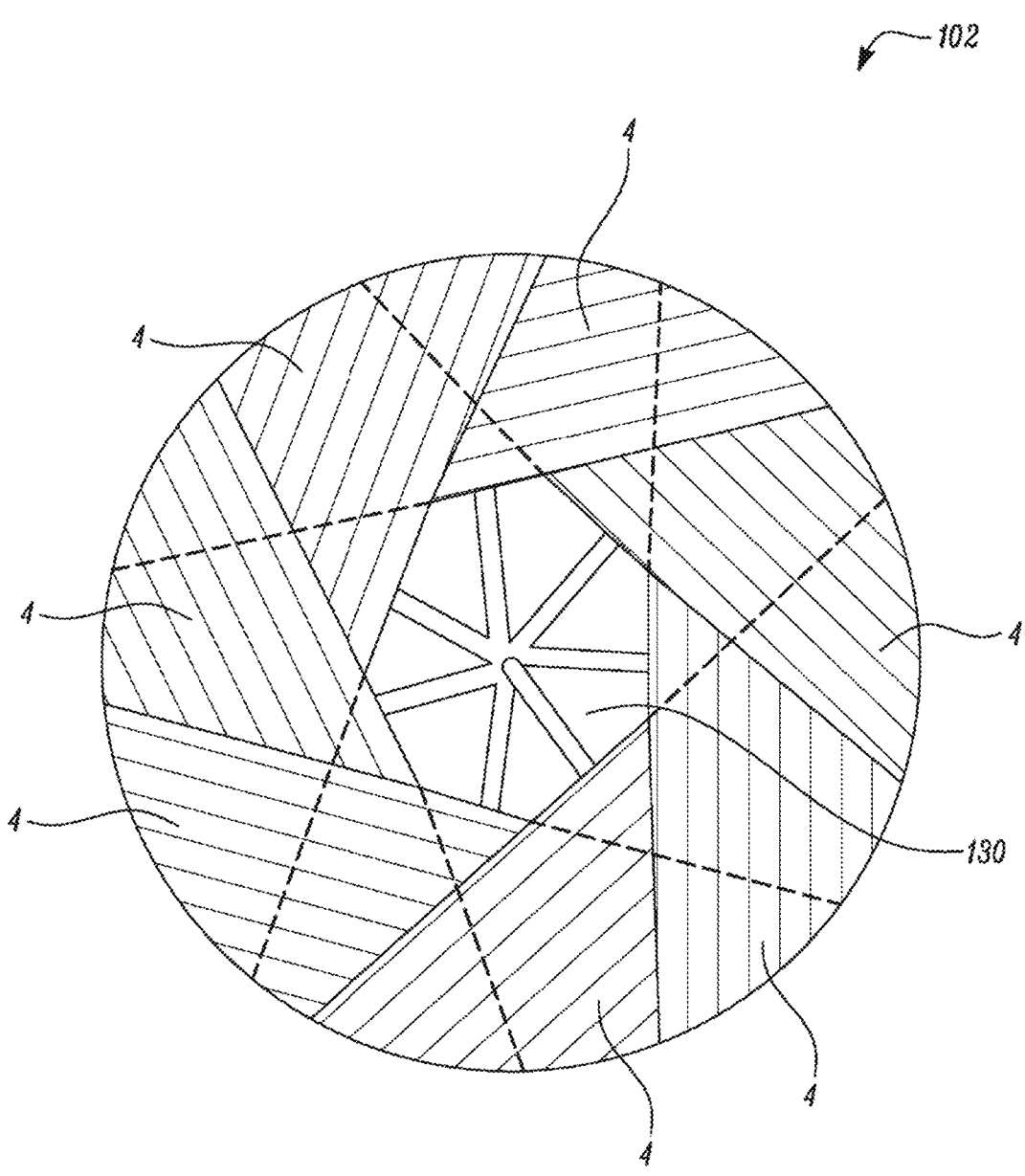
FIG. 9 is a plan view of a first alternative dome.

FIG. 9 is a plan view of a first alternative dome 102. The blocks 4 of the first alternative dome 102 overlap horizontally so as to be self-supporting, thereby reducing the need for scaffolding and crane payload. Portions of the blocks 4 disposed beneath other blocks 4 are shown in phantom. A first alternative keystone 130 is used to close the top of the first alternative dome 2. In the arrangement shown in FIG. 9, the first alternative keystone 130 is heptagonal.

Figure 10:
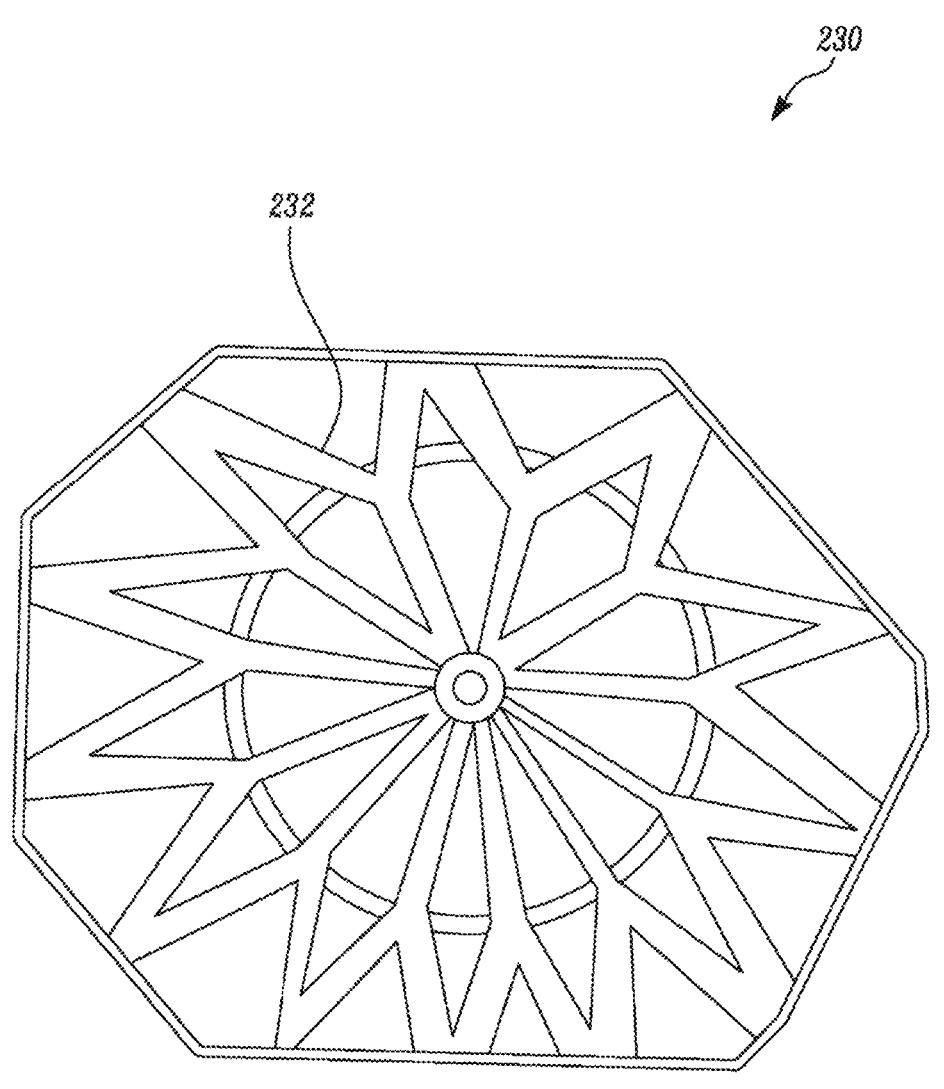
FIG. 10 is a plane view of a second alternative keystone.

FIG. 10 shows a second alternative keystone 230. The second alternative keystone 230 is heptagonal and formed of discrete plate segments that are welded together along weld lines 232. The second alternative keystone 230 is a prismatic structure. In alternative arrangements, the keystone may be any suitable shape for closing the dome structure. For example, the keystone may be an irregular shape. In any of the alternative shapes the keystone may be made as a single piece or from multiple segments. If made from multiple segments they may be welded together in a factory before delivery to site.

Figure 11:
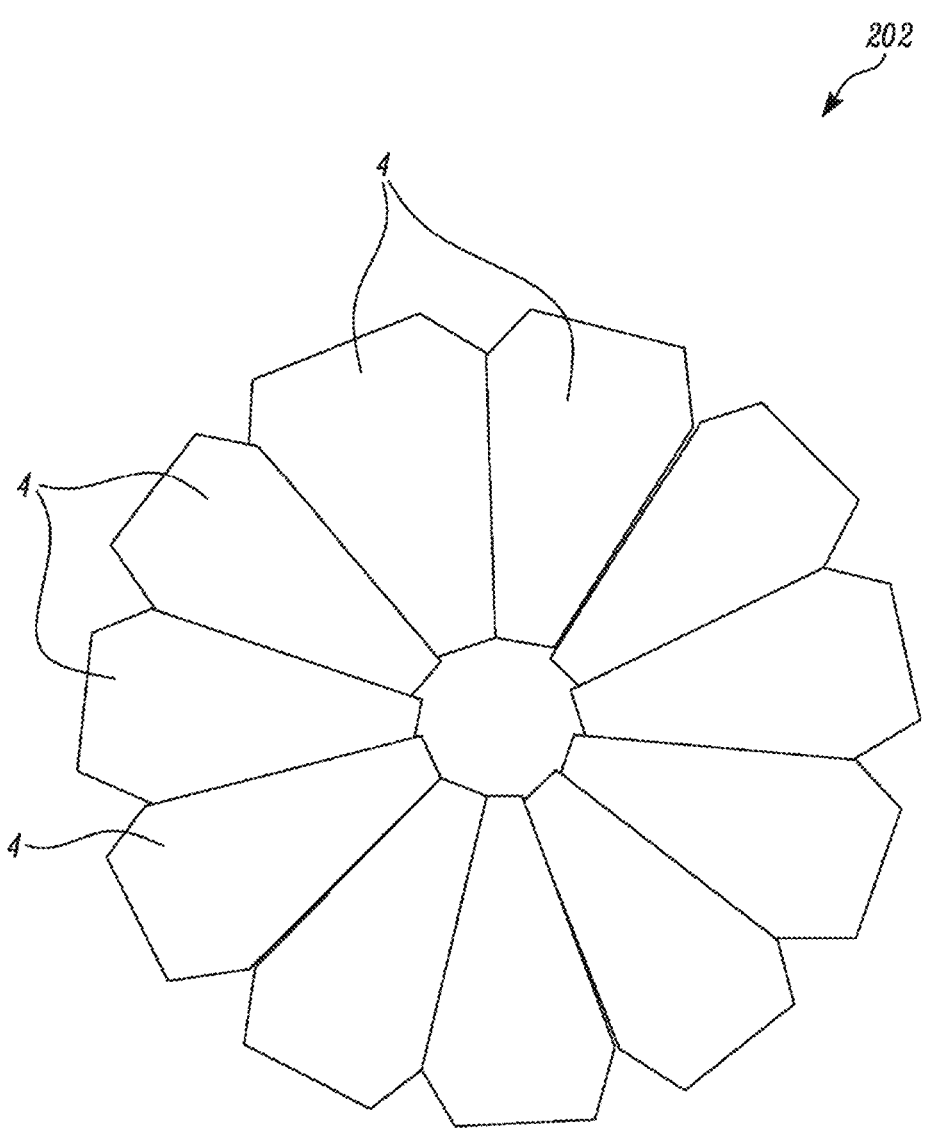
FIG. 11 is a plan view of a second alternative dome.

FIG. 11 is a plan view of a second alternative dome 202. The components 4 of the second alternative dome 202 are in the form of petals that decrease in width towards the top of the second alternative dome 202 such that they do not overlap horizontally. The petals can be trimmed on site to allow for a greater variation in their geometry.

FIG. 12 shows a third alternative dome 302 part way through manufacture. The blocks of the third alternative dome 302 are arranged in multiple helical spirals with multiple starts. This allows multiple welds to be carried out simultaneously. Four of the multiple starts of the third alternative dome 302 of FIG. 12 are denoted using reference numerals 4p, 4q, 4r and 4s, by way of example.

Figure 13:
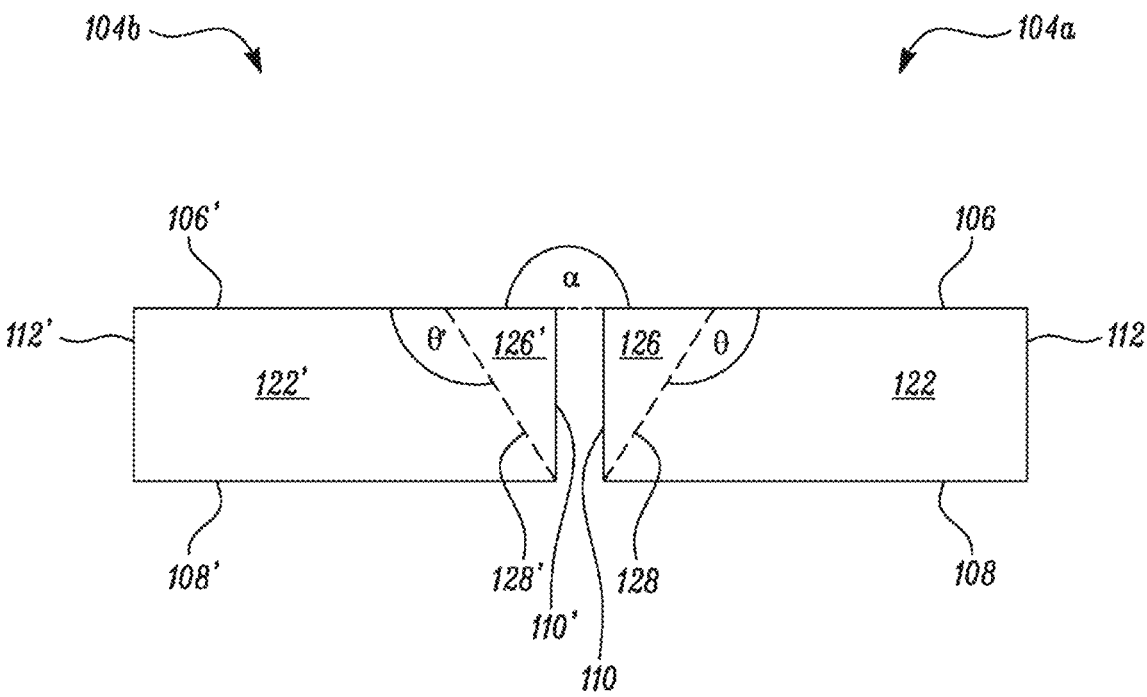
FIG. 13 is a first cross-sectional view of an alternative first block and an alternative second block of a pair of blocks.

FIG. 13 shows an alternative first block 104a and an alternative second block 104b of the pair of blocks. The alternative first and second blocks 104a, 104b generally correspond to the first and second blocks 4a, 4b and the features thereof are denoted using corresponding reference numerals with the addition of a value of 100. However, the angle formed between the first surfaces 106, 106' and the third surfaces 110, 110' is approximately 90 degrees. The alternative first block 104a comprises a first body portion 122 and a first connection portion 126. Likewise, the alternative second block 104b comprises a second body portion 122' and a second connection portion 126'.

The first connection portion 126 defines the third surface 110 of the alternative first block 104a. The second connection portion 126' defines the third surface 110' of the alternative second block 104b. The angle θ formed between the first surface 106 of the alternative first block 104a and the interface 128 between the first body portion 122 and the first connection portion 126 is greater than 90 degrees. Likewise, the angle θ formed between the first surface 106' of the alternative second block 104b and the interface 128' between the second body portion 122 and the second connection portion 126' is greater than 90 degrees. The first body portion 122 and the first connection portion 126 of the alternative first block 104a are unitary. Likewise, the second body portion 122' and the second connection portion 126' of the alternative second block 104b are unitary.

Figure 14:
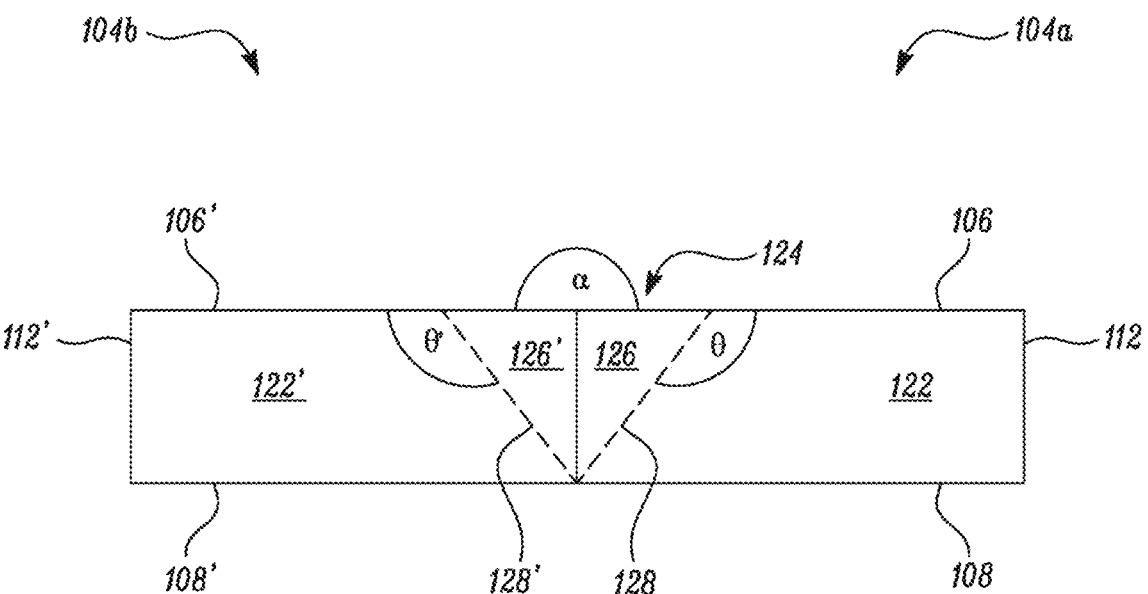
FIG. 14 is a second cross-sectional view of the alternative first block and the alternative second block.

A substantially identical method to the method 100 described previously is used to manufacture a dome 2 using a plurality of pairs of blocks 4 comprising alternative first and second blocks 104a, 104b. Following step B1, the alternative first and second blocks 104a, 104b are arranged as shown in FIG. 14.

Figure 15:
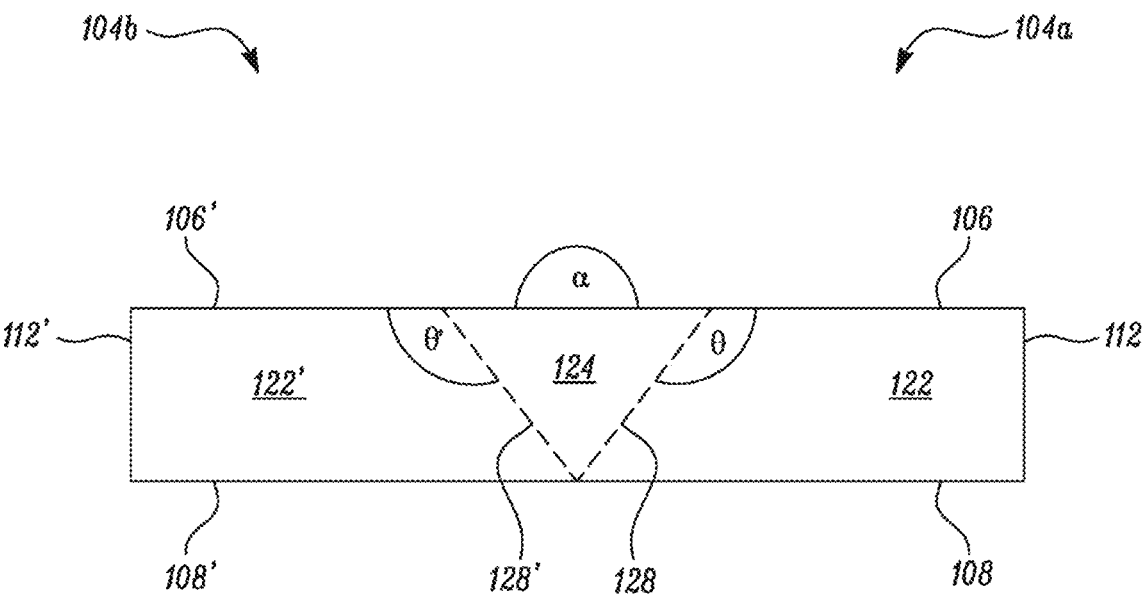
FIG. 15 is a third cross-sectional view of the alternative first block and the alternative second block.

The first and second connection portions 126, 126' of the alternative first and second blocks 104a, 104b together form a volume of material 124 that extends between the first body portion 122 and the second body portion 122'. The volume of material 124 increases in thickness from the second surfaces 108, 108' of the first and second body portions 122, 122' to the first surfaces 106, 106' of the first and second body portions 122, 122'. Accordingly, the volume 124 of material is wedge-shaped. As with the method described previously, the second substep B2 of the method of manufacturing a dome 2 comprises melting the volume of material 124. The resulting arrangement is shown in FIG. 15. The volume of material 124 remains melted and the first surface 106 of the first body portion 122 and the first surface 106' of the second body portion 122' remain angled from each other by a first angle α of 180 degrees.

The third substep B3 of the method of manufacturing a dome 2 using a plurality of pairs of blocks 4 comprising the alternative first and second blocks 104a, 104b corresponds to the third substep B3 of the method of manufacturing a dome 2 using a plurality of pairs of blocks 4 comprising the first and second blocks 4a, 4b and results in an arrangement as shown in FIG. 7, in which the angle between the first surface 106 of the first body portion 122 and the first surface 106' of the second body portion 122' is reduced to a second angle β less than the first angle α such that the first surface 106 of the first body portion 122 and the first surface 106' of the second body portion 122' form part of an inner surface of the dome 4.

The process described with reference to FIGS. 7 and 13 to 15 may be an electron-beam welding or power beam welding process. Lower components of a dome may be joined using the process described with reference to FIGS. 7 and 13 to 15 and higher components of the dome may be joined using the process described with reference to FIGS. 4, 6 and 7. Some joins may be formed using rotary taper friction welding.

Although it has been described that the plurality of components forming the dome are blocks 4, they may alternatively be beams 34. The plurality of beams 34 may comprise a plurality of pairs of beams 34 comprising a first beam and a second beam and be used to manufacture the dome using the method described with reference to FIGS. 3 and 5. The beams 34 may form a fourth alternative dome 402 such as that shown in FIG. 16. The fourth alternative dome 402 is a geodesic dome. The fourth alternative dome 402 may be welded upside down (i.e. with the concave side of the fourth alternative dome 402 facing upwards), heat treated and then flipped to its final orientation for assembly.

Gaps formed between the beams 34 may be covered by triangular plates 36. Although only five plates 36 are shown in FIG. 16, all of the gaps formed between the beams 34 may be covered by triangular plates 36 so as to form a continuous structure or skin. The plates 36 may be planar or curved. Curved plates may be formed from planar plates using the method described with reference to FIGS. 3 to 7. Segments of the dome comprising multiple beams 34 may be fabricated separately and subsequently welded together so as to permit welding in favourable locations. The prefabricated segments may be in the form of multiple beams 34 arranged in hoops that are stacked vertically to form the dome.

FIG. 17 shows a fifth alternative dome 502. The plurality of components of a lower portion of the fifth alternative dome 502 are blocks 4, whereas the plurality of components of an upper portion of the fifth alternative dome 502 are beams 34. The lower portion of the fifth alternative dome 502 may correspond to the lower portion of the dome 2 or third alternative dome 302 described with reference to FIGS. 1 and 12. The upper portion of the fifth alternative dome 502 may correspond to the upper portion of the fourth alternative dome 402.

Figure 18:
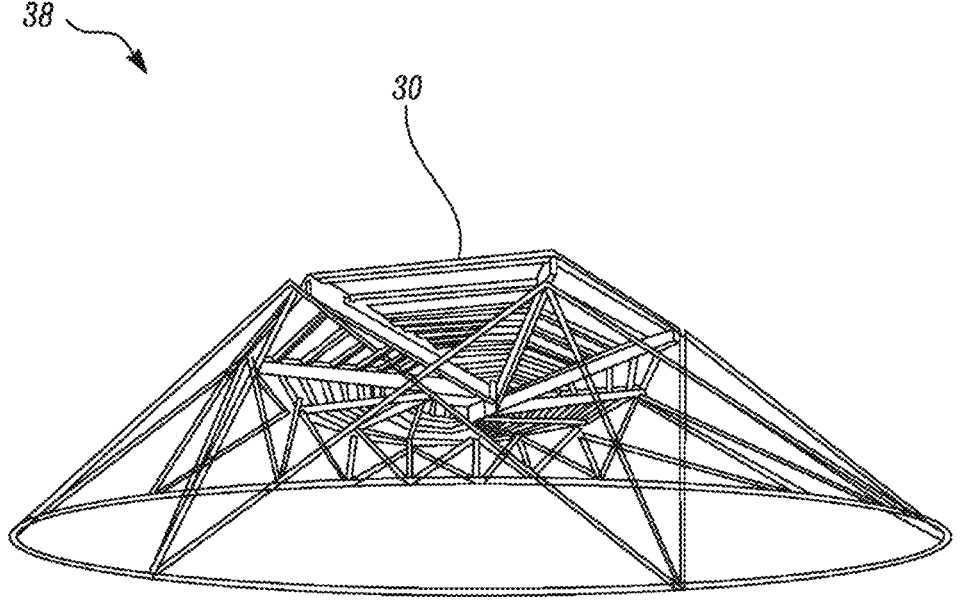
FIG. 18 is a perspective view of a support.

FIG. 18 shows a support 38 in the form of a truss that can be used to support the keystone 30 in position whilst the domes are being manufactured. The support 30 may comprises a frame disposed within the dome. Horizontal thrust can be contained by the support 30 acting on the interior of a lower portion of the dome 2. Alternatively, horizontal thrust can be contained by brackets to the tubular shell, mechanical constraints from a ring of interlocked beams or a plurality of coils of high tension steel cable. Once manufacture of the dome is complete, the support 30 may be disassembled.

Although it has been described the that the block 4 is substantially cuboidal in shape, the fifth and second surface 6, 8 may be parallel but arranged at a non-orthogonal angle with respect to the fifth and sixth surfaces 14, 16 so that the blocks have parallelogram cross-sections as shown in FIG. 19.

In alternative arrangements, multiple domes having different radii may be manufactured using the above described methods. An inner dome may be used to support the construction of an outer dome.

It will be appreciated that the inner surface of the dome specifically refers to the inner surface of the dome formed by the plurality of components. It will be appreciated that additional bodies may be disposed within the inner surface of the dome formed by the plurality of components. The inner surface of the dome is not therefore necessarily the innermost surface of the dome.

A model is used to calculate the change in the angle from α to β between the first component, e.g. body portion 122, and second component e.g. body portion 122', to predict how much the angle will reduced to a second angle β less than the first angle α, during cooling and solidifying of the volume of material (24, 124).

The model works by calculating the thermal contraction from each successive pass for a given weld preparation. The thermal contraction is calculated by modelling the heat input of the welding process (absorbed energy and the travel speed), using this heat input to calculate the amount of weld metal laid down and the resulting dynamic temperature distribution. The temperature field can be used to inform a mechanical model, including data for phase changes, constraints and the material strength properties with temperature to predict the plastic and elastic strain distribution for each successive weld.

Figure 20:
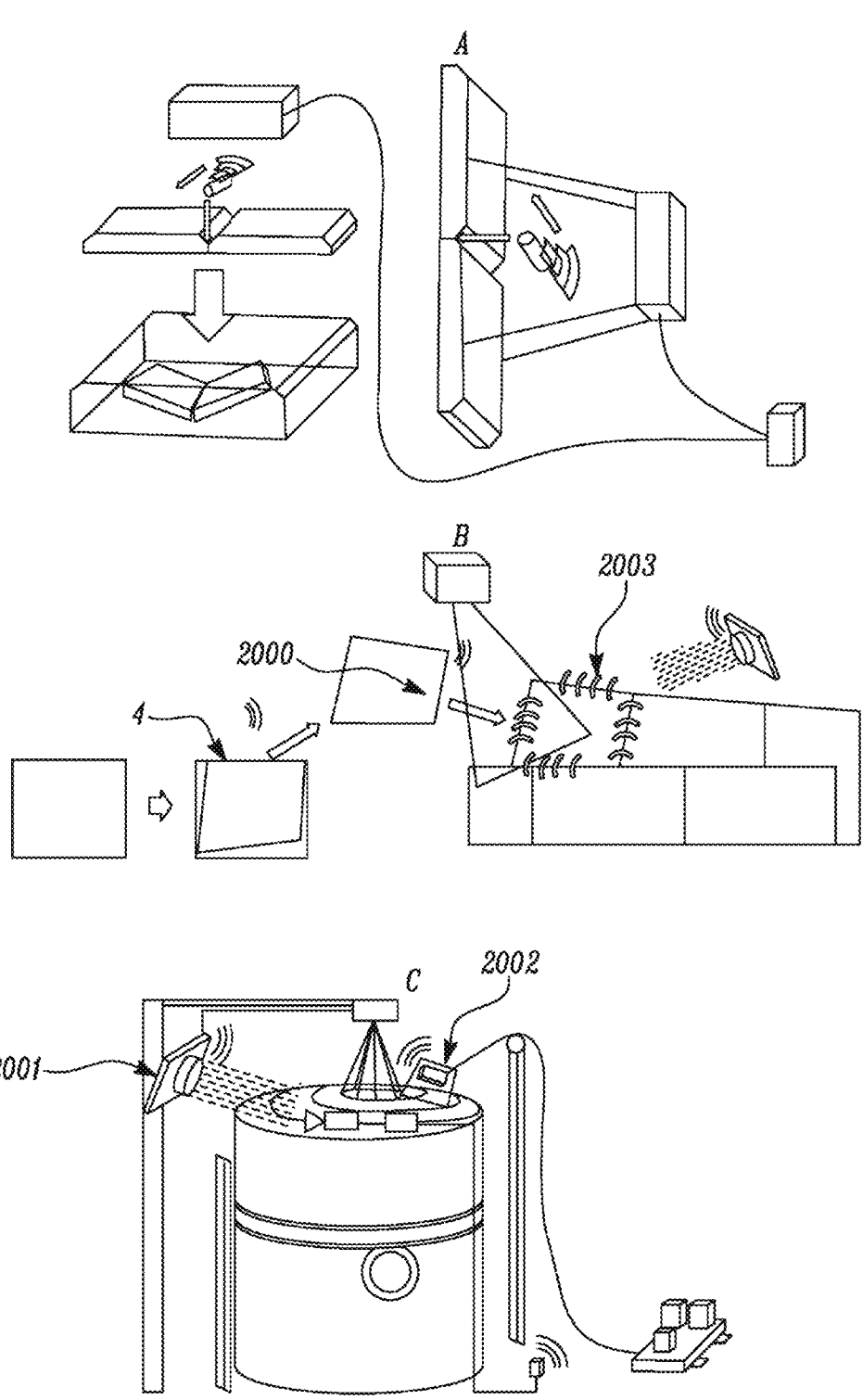
FIG. 20 shows an automated assembly of a dome.

The proposed assembly sequence, using the method described above, is as follows. See FIG. 20. Components, for example steel segments, are aligned and automatically welded to a precise shape in a controlled, sheltered environment 20-A.

This welding may be multiple pass. The precision from the cuts for the edge profile limits the fit variation which must be accommodated by multiple filling passes. The cut edges to be welded need not be cut or set to align the plates to be coplanar, as shown in the figures herein, an angle can be formed and the change in angle after cooling can be modelled to determine the cut angle for the edge to be joined, such that a required angle for the overall design will be achieved when the weld cools.

The e.g. steel segments 4 delivered to site are limited by mass and transporter dimensions. The shapes need not be square or rectangular. In FIG. 20B, after welding each section in place (a geodetic spiral is one possible form) the resultant shape is scanned by scanner 2000 to inform the required geometry for the next plates in the sequence to form the shape. Adaptive trimming is used to ensure the next segment will align with the previously welded pieces and form the correct angles after the welds have solidified. Strong-back features 2003 maybe used, these locate and restrain the sections in the weld fabrication sequence.

Adaptive trimming, optionally supported by positioning aids and pre-fabricated strong-backs (temporary stiffeners), permits automation of welding using remote controlled tractor units with sensors. The preparation, positioning, welding, scanning and strong-back removal can be done using semi-autonomous roving units which communicate progress, FIG. 20C. Two units may be required, the lead unit

2001 scans the joints of placed segments and the trailing unit 2002 welds, inspects and removes strong-backs The adaptive trimming permits some fibre transmitted laser welding which shortens time and limits the need for high voltage cables on site.

Tighter tolerances mean narrower more consistent joints, suited to remote automation. Reduced weld passes reduce welding time.

By combining the approach with the scanning and use of frames, the gaps to be filled can be substantially reduced, this lessens the amount of weld filler material required which saves cost (less passes, less deposited material), but also reduces the degree of strain and so helps the prediction of the strain.

The above methods allow domed structures such as a domed vessel to be constructed on site in manner in a relatively quick and inexpensive manner that requires minimal space.

The dome 2 may be a dome for a power station reactor. The dome may alternatively be any suitable dome such as a dome for storing compressed gases, a heat reservoir, a bridge, a ship or an architectural fabrication. The dome may be used for storage of gases such as hydrogen. Gas storage may be carried out under normal operating conditions. Alternatively, the dome may store (i.e. contain) gases that have leaked from a structure contained within the dome.

The invention claimed is:

1. A method of manufacturing a dome, the method comprising:

providing a plurality of components comprising a plurality of pairs of components, each of the plurality of pairs of components comprising a first component and a second component, the first component having a first body portion defining a first surface and a second surface opposing the first surface and the second component having a second body portion defining a first surface and a second surface opposing the first surface; and joining the first and second components of each of the plurality of pairs of components together so as to form at least part of the dome, wherein joining the first and second components of each of the plurality of pairs of components together comprises:

positioning the first component and the second component in an initial position in which the first surface of the first body portion and the first surface of the second body portion are angled from each other by a first angle $(\alpha)$;

melting a volume of material extending between the first body portion and the second body portion, the volume of material increasing in thickness from the second surfaces of the first and second body portions to the first surfaces of the first and second body portions;

calculating a predicted change from the first angle $(\alpha)$ to a second angle $(\beta)$ between the first surface of the first body portion and the first surface of the second body portion during cooling and solidifying of the volume of material;

trimming either the first or second component to control the second angle $(\beta)$ obtained after cooling; and the volume of material cooling and solidifying so as to join the first component and the second component together, the cooling of the volume of material reducing the first angle between the first surface of the first body portion and the first surface of the second body portion to the second angle $(\beta)$ less than the first angle $(\alpha)$ such that the first surface of the first body portion and the first surface of the second body portion face towards a centre of the dome and the first and second components form part of the dome.

2. The method of claim 1, wherein the volume of material of pairs of components forming a lower portion of the dome comprises a filler material and the volume of material of pairs of components forming an upper portion of the dome is formed from the first component and the second component.

3. The method of claim 1, wherein two or more of the first body portions and the second body portions each comprise a slot and a protrusion, wherein each slot is configured to receive a protrusion and each protrusion is configured to be received by a slot.

4. The method of claim 1, wherein the first and second components are blocks or plates.

5. The method claim 1, wherein the plurality of components are arranged in a helical spiral.

6. The method of claim 5, wherein each of the plurality of components overlaps horizontally with one or more of the other of the plurality of components.

7. The method of claim 1, wherein the first and second components are beams.

8. The method of claim 7, wherein the plurality of components form a geodesic dome.

9. The method of claim 1, wherein the first and second components of pairs of components in a lower portion of the dome are blocks or plates and wherein the first and second components of pairs of components in an upper portion of the dome are beams.

10. The method of claim 1, wherein an extent by which the volume of material increases in thickness from the second surfaces of the first and second body portions to the first surfaces of the first and second body portions increases in relation to a distance of the pair of components from a base of the dome.

11. The method of claim 1, wherein the step of calculating the change from the first angle $(\alpha)$ to the second angle $(\beta)$ comprises modelling a heat input of a welding process, using the heat input to calculate an amount of weld metal laid down and a resulting dynamic temperature distribution.

12. The method of claim 1, wherein after joining the first and second components together, scanning a resultant shape to inform a geometry for the next components in a sequence to form a desired shape, trimming the next component such that it will align with previously joined components and form correct angles after the volume of material has solidified.

13. The method of claim 1, wherein the method is carried out using automated scanning and welding units.

* * * * *